United States Patent [19]

Fetters

[11] 4,399,848
[45] Aug. 23, 1983

[54] TREE CUTTING MECHANISM

[76] Inventor: Wayne A. Fetters, P.O. Box 841, Canby, Oreg. 97013

[21] Appl. No.: 319,804

[22] Filed: Nov. 9, 1981

[51] Int. Cl.³ ............................................. A01G 23/08
[52] U.S. Cl. ................................. 144/34 E; 144/3 D; 144/339
[58] Field of Search .................. 144/34 E, 34 R, 3 D, 144/336, 339; 83/928

[56] References Cited

U.S. PATENT DOCUMENTS

| | | | |
|---|---|---|---|
| 2,538,371 | 10/1946 | Tourneau | 83/928 |
| 2,566,088 | 5/1948 | Tourneau | 83/928 |
| 3,924,667 | 12/1975 | McKenzie | 144/3 D |
| 4,291,492 | 9/1981 | Reynolds | 144/2 Z |
| 4,371,017 | 2/1983 | Lindblom | 144/3 D |

FOREIGN PATENT DOCUMENTS

369877  4/1973  U.S.S.R. ............................ 144/336

Primary Examiner—Robert E. Garrett
Assistant Examiner—Jorji M. Griffin
Attorney, Agent, or Firm—Eugene M. Eckleman

[57] ABSTRACT

A cutter vehicle is arranged to be moved along a row of trees by a powdered drive vehicle. A boom assembly is secured between the cutter vehicle and the drive vehicle and has relatively movable parts which can extend and retract to vary the longitudinal length of the boom assembly. The cutter vehicle has a powered cutter arranged to cut a tree off adjacent the ground. The mechanism has controls capable of actuating the power cutter substantially simultaneously with release of the power for the boom assembly whereby the movable parts of the boom assembly can have free relative movement to allow the powered drive vehicle to advance while the cutter vehicle has stopped momentarily to cut a tree, this providing an arrangement which allows a drive vehicle to maintain a steady advancing movement even though the cutter vehicle has stopped to cut a tree. The boom assembly has pivot support which provides lateral positioning of the cutter vehicle to bypass a tree if desired. The cutter vehicle has a main frame which supports a vertically adjustable secondary frame having a lowered position for cutting a tree off adjacent the ground and a raised position for movement over the stump.

12 Claims, 11 Drawing Figures

TREE CUTTING MECHANISM

BACKGROUND OF THE INVENTION

This invention relates to new and useful improvements in tree cutting mechanisms and is particularly adapted for rapidly harvesting small trees such as Christmas trees.

Christmas trees are raised on large tracts and harvested at selected times for supply to the public. In order to provide fresh trees and also to meet the demand of the public, the trees must be harvested rapidly. This usually requires a crew of men which of course creates many problems as to the short period of employment, competent help, bookkeeping, etc.

Power tree cutters have heretofore been provided which are adapted to shear trees off at the trunk. Such previous cutters, however, are not satisfactory for rapid cutting of Christmas trees since such prior devices cannot cut enough trees to warrant their use. That is, when a cutter must move up to a tree, stop and cut the tree, and then move to the next tree, the time consumed does not make it practical to use machines of the type that are now available.

SUMMARY OF THE INVENTION

According to the present invention and forming a primary objective thereof, a tree cutting mechanism is provided that accomplishes fast cutting of trees and has structure which allows it to be combined with a powered drive vehicle and which allows such drive vehicle to move down a row of trees without stopping, including the time which the cutter mechanism has stopped momentarily to shear a tree, thus providing a fast harvest of trees in a very short time.

In carrying out the invention, a cutter vehicle is arranged to be moved along a row of trees by a powered drive vehicle and is connected to the power drive vehicle by a boom assembly. The boom assembly is constructed of relatively movable parts operable to vary the longitudinal length of the assembly. Power means are provided on the boom assembly which are arranged to operate the assembly as well as to release the movable parts to provide floating functioning of the parts. The cutter vehicle has laterally movable power cutting means. Controls are provided which actuate the power cutter means to cut a tree substantially at the same time that it releases the power means on the boom assembly whereby said boom assembly can float in length and allow the power drive vehicle to maintain a steady advancing movement including the time at which the cutter vehicle has stopped momentarily to shear a tree. The boom assembly includes pivot means providing lateral positioning of the cutter vehicle whereby to bypass a tree if desired, such pivot means preferably including a parallelogram linkage providing forwardly directed positioning of the cutter vehicle in all lateral positions thereof. The power cutter means comprises a laterally movable shearing blade, and the control means includes trip means arranged to actuate the power cutter means when the guide means receives a tree therein. The trip means also releases the power means on the boom assembly for its floating functioning. The cutter vehicle has a main frame for ground engaging support and it also has a secondary frame which is pivotally supported at one of its ends and associated with power lift means connected between the main frame and the secondary frame for pivoting the latter upwardly following a shearing step to clear a stump made by a cut of the power cutter means.

The invention will be better understood and additional objects and advantages will become apparent from the following description taken in connection with the accompanying drawings.

DETAILED DESCRIPTION OF A PREFERRED EMBODIMENT

Figures 1, 2:
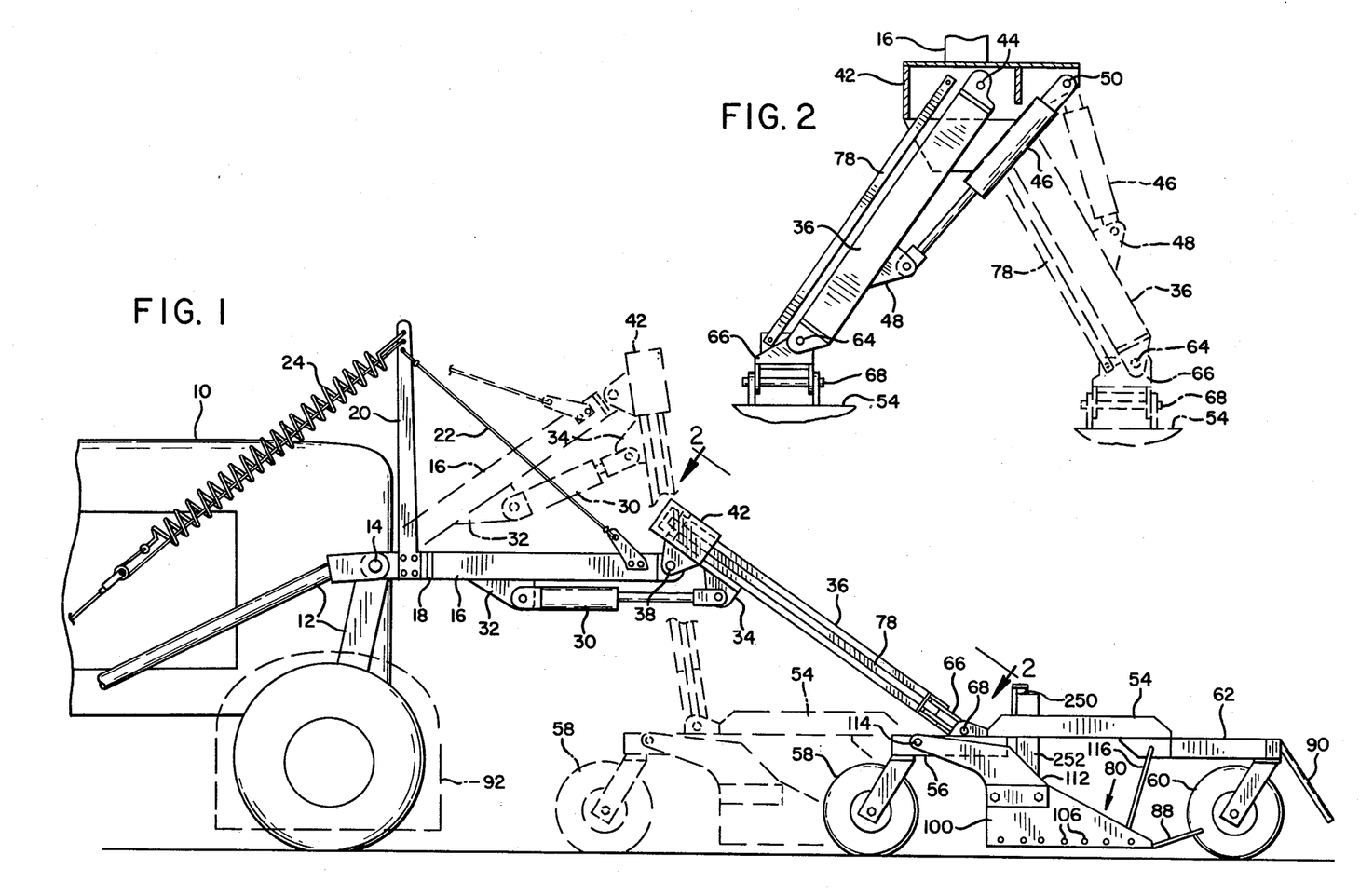
FIG. 1 is a side elevational view of a first form of the present tree cutting mechanism, this view showing extended and retracted positions of the connecting boom assembly in full and broken lines, respectively.
FIG. 2 is a fragmentary plan view showing supporting boom structure and also showing in broken lines a lateral positioning of the boom, this view being taken on the line 2—2 of FIG. 1.
Figures 3, 4:
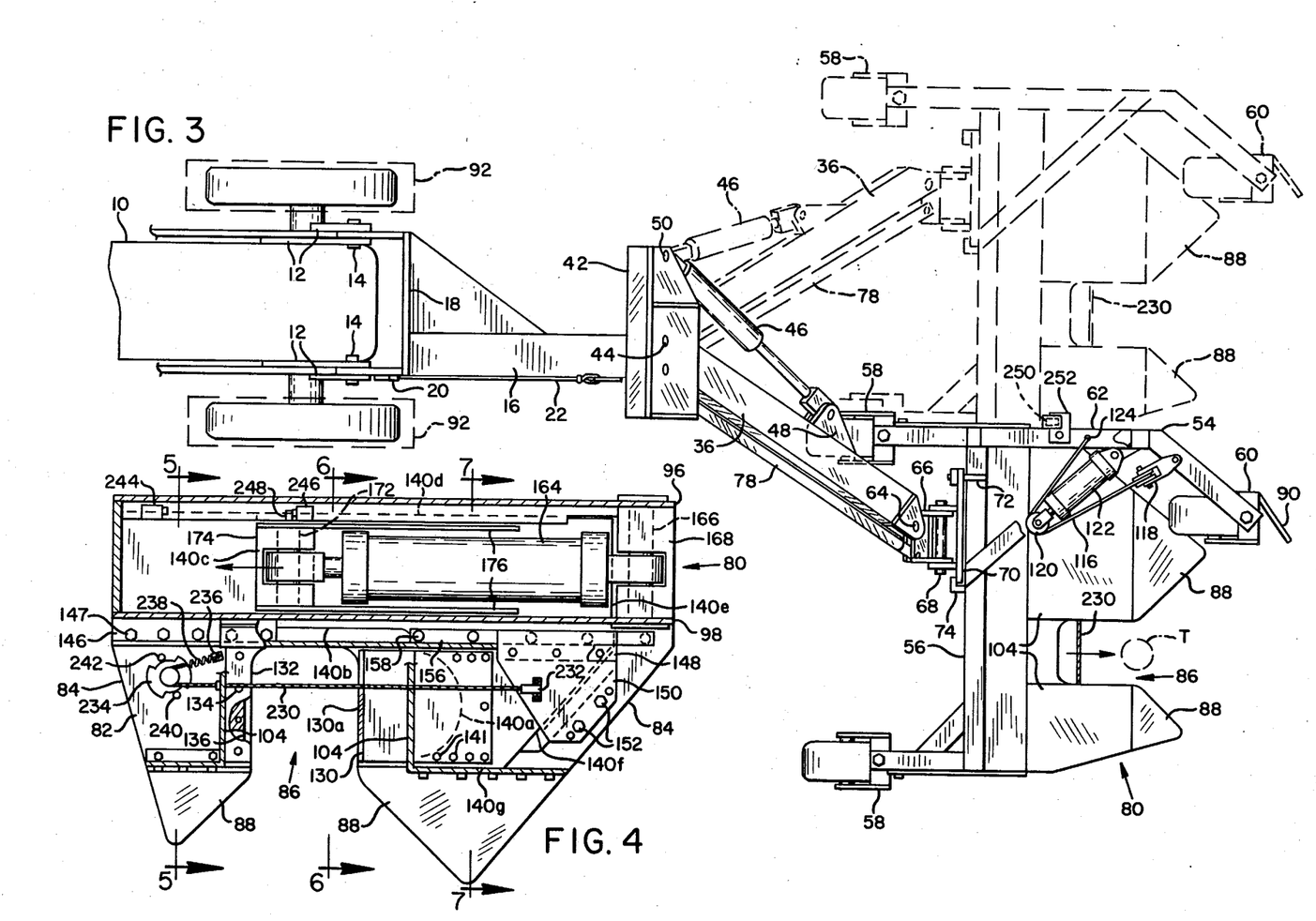
FIG. 3 is a top plan view of the present cutter mechanism, such view showing lateral positioning of the mechanism in broken lines.
FIG. 4 is an enlarged plan view of cutter mechanism, parts of such mechanism being broken away for clarity.

With particular reference to the drawings and first to FIGS. 1, 2 and 3, a first embodiment of the present tree cutting mechanism is shown which is pushed by a powered drive vehicle 10 of any suitable structure, such as a wheeled tractor as shown, a crawler tractor, etc. For such mounting purpose, the drive vehicle 10 is supplied with a front support frame 12. Frame 12 provides a pivot support connection 14 for one end of a primary boom 16 having a rear bifurcated frame portion 18 arranged to straddle the vehicle 10 and have pivot support on the connection 14. Rearward portion of primary boom 16 has an upstanding post 20 with a cable 22 connected between the upper portion thereof and the outer end of boom 16 to provide support for the latter, and such post also is supported in a counter direction by a resilent member 24 such as a heavy duty spring connected rearwardly to the drive vehicle 10.

An hydraulic cylinder 30 is connected between an ear 32 on the bottom of primary boom 16 and an ear 34 on the bottom side and adjacent the rear of a secondary boom 36. The rearward end of boom 36 has a transverse pivot connection 38 to the outer or free end of the primary boom 16 whereby upon extension of the cylinder 30 the boom assembly is straightened, or upon retraction of the cylinder, the booms are moved toward a vertical position. Or, upon forward movement of the drive vehicle 10 and release of pressure in the cylinder 30 and a resistance force against the lower end of the boom 36, the booms can move upwardly into such broken line position, as will be more apparent hereinafter.

The boom 36 has support on the pivot connection 38 through the medium of a cross frame member 42 integral with the pivot connection 38. Connection of the boom 36 to the cross frame member 42 is by means of a pivot 44 extending on an upright axis for allowing the boom 36 to swing laterally. Such lateral movement is powered by an hydraulic cylinder 46 connected between an ear 48 on one side of the boom 36 adjacent a lower portion thereof and a pivot connection 50 on the cross frame member 42 spaced laterally of the pivot connection 44. By operation of the hydraulic cylinder 46, boom 36 is arranged to be moved between the full and broken line positions shown in FIGS. 2 and 3.

The lower end of boom 36 is connected to a cutter vehicle 54 having a cross frame 56 supported on a pair of rear caster wheel assemblies 58 and a single forward caster wheel assembly 60 mounted at one side of the frame 56 by a frame extension 62.

The connection between the secondary boom 36 and the cutter vehicle 54 is by means of a triple pivot comprising a first pivot 64 connected to a bracket 66 on an upright axis allowing lateral turn of the vehicle relative to the boom. A second pivot connection 68 extends laterally and is provided between the bracket 66 and another bracket 70 which allows longitudinal tilting of the vehicle relative to the horizontal. A third pivot 72 is provided between the bracket 70 and the cross frame 56 of the vehicle 54, and such bracket allows lateral tilting of the vehicle relative to the horizontal. The longitudinal drive but horizontal adjustment is provided between the bracket 70 and the frame 56 by means of an upright angled guide 74 on the frame 56. By means of the pivot connections 64, 68 and 72, the cutter vehicle can pivot on an upright axis and also can adjust longitudinally and laterally to uneven ground contours.

A boom link 78 is pivotally connected between the frame 42 and bracket 66 in a parallelogram arrangement with the boom 36 whereby upon movement of the boom 36 laterally, the cutter vehicle will always remain in a forwardly facing position, as apparent in broken lines in FIG. 3.

With particular reference to FIG. 3, the primary boom 16 is located to one side of its support frame 18 and the boom 36 is disposed to the same side of the cross frame member 42. Also, the attachment of boom 36 to the cutter vehicle 54 is offset to one side of the latter, such connections providing a lateral offset of the cutter vehicle relative to the drive vehicle 10 whereby the latter vehicle can move down between rows of trees with the cutter vehicle aligned with the row of trees to the right.

A tree cutter head 80, FIGS. 1 and 3–7, is supported on the vehicle 54 and comprises a heavily constructed bottom wall 82, FIGS. 4–7. The shape of plate 82 in plan is best seen in FIG. 4, such plate being substantially rectangular in its rear portion and having inwardly tapered side edges 84 at the front. A tree receiving recess 86 leads inwardly from the front of the bottom plate 82 and is defined on the sides thereof by upwardly angled pointed guides 88 which guide a tree into the recess. The angled side edges and the angled guides 88 thread efficiently through tree limbs associated with cutting of the trees. Frame 54 also has a deflector bar 90 angled across in front of the front wheel assembly to deflect limbs, and it may be desirable as well to provide covers or other deflecting means 92 (shown in broken lines in FIGS. 1 and 2) on various parts of the drive vehicle to deflect trees or limbs.

The cutter head 80 also includes sturdy rear and front walls 96 and 98, respectively, suitably secured integrally to the bottom wall 82 such as by welding and extending parallel to each other. These walls and other members to be described are associated with enclosing side panels 100, FIGS. 1 and 5–7, a top panel 102, and a front panel 104. The front panel is tapered down at the front which also provides efficient threading of the head 80 past trees or limbs. The front panel 104 is broken away in FIG. 4. These panels are removably secured to the frame members 82, 96 and 98, as by bolts 106, and form a housing for cutter mechanism to be described. Front panel 104 is in two sections, FIG. 3, to conform with the shape of bottom plate 82 and provide front access for recess 86.

Cutter head 80 is pivotally supported on the vehicle 54 by side arms 112, FIG. 1, bolted to the ends of walls 96 and 98 and having pivot connections 114 to cross frame 56. The cutter head 80 is supported at the front by a cable 116, FIGS. 1 and 3, secured at its lower end to such apparatus, such as to a front bolt 106. This cable extends up through a pulley 118 mounted on the arm 62 and then passes over a pulley 120 on the end of an hydraulic cylinder 122 secured at its other end to the arm 62. By expansion of cylinder 122, the head 80 is pivoted upwardly at the front. Such apparatus is supported at the front solely by the cable 116 and lowers by gravity upon retraction of the cylinder.

Figure 5:
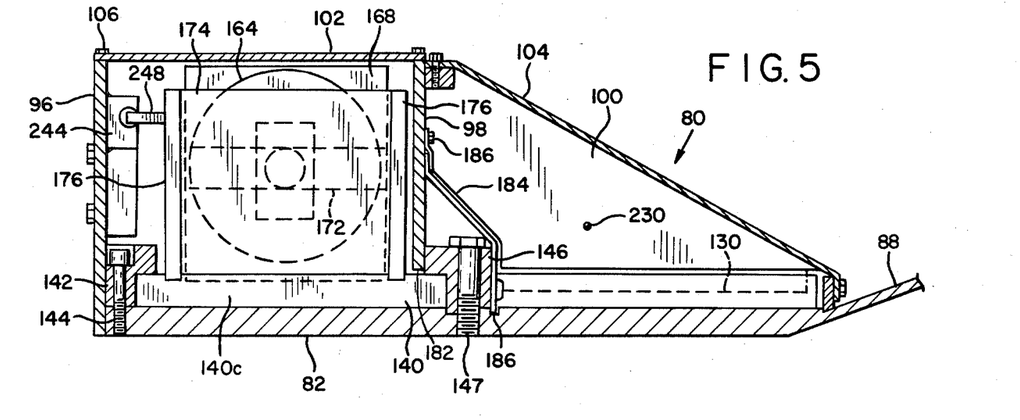
FIGS. 5, 6 and 7 are enlarged sectional views taken on the lines 5—5, 6—6 and 7—7 of FIG. 4, respectively.
Figure 6:
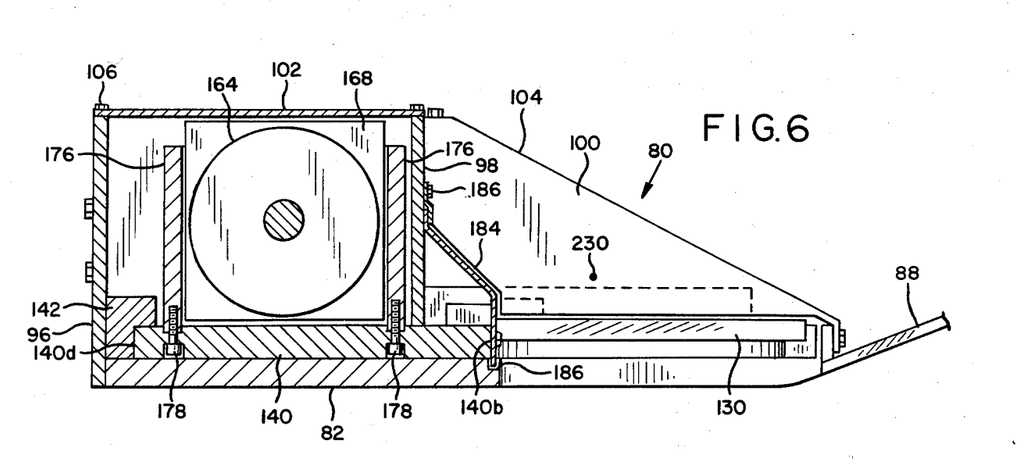
Figure 7:
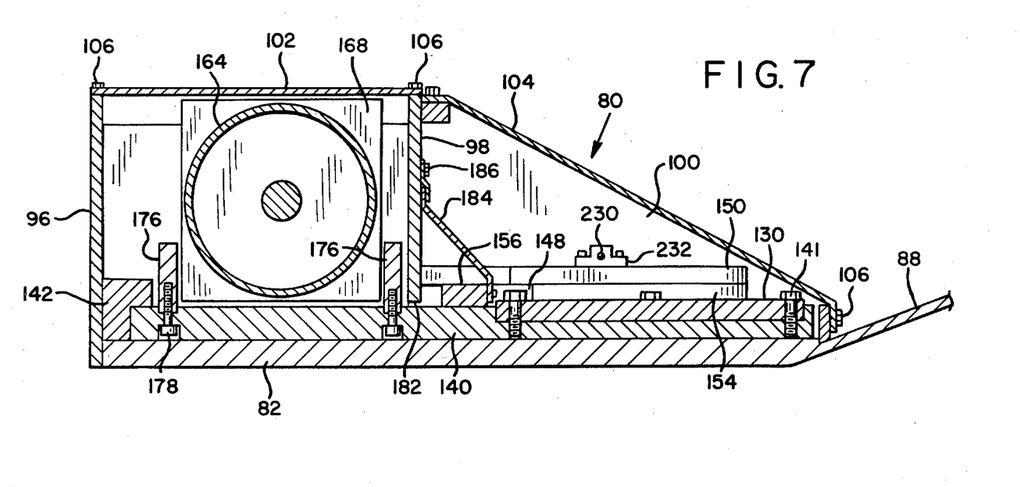

A cutter blade 130, FIGS. 4–7, operates transversely between a retracted position as shown in FIG. 4 and an extended position across the front facing tree recess 86. This blade has a sharpened cutting edge 130a. It operates at the completion of its cutting stroke in association with an abutment bar 132 which is secured to the bottom wall 82 by bolts 134 and which braces the tree trunk against the cutting force of the blade. Abutment bar 132 has an edge groove 136 facing the blade 130 and aligned therewith to allow a complete travel of the knife through the tree. Blade 130 is rectangular in plan and is secured to a slide plate 140, as by bolts 141, having surface sliding support on the top of bottom wall 82. Slide plate 140 in plan, FIG. 4, has a recessed edge 140a which faces the recess 86 and which provides a clearance area for the tree when being cut, a transversely extending edge 140b leading from the rear portion of recessed edge 140a, a longitudinal edge 140c extending to a point just short of the rear wall 96, as seen in FIG. 5, a rear transverse edge 140d, a longitudinal edge 140e having an angled forward portion 140f, and a front edge 140g. The slide plate 140 has guided movement at the rear by a forwardly notched bar 142 secured as by bolts 144, FIG. 5, to bottom wall 82. Front guided movement of this slide plate is provided by a rearwardly notched bar 146 secured as by bolts 147 to the bottom wall 82. Guide bar 146 only extends through a portion of the width of the apparatus 80 and guided movement of the other side of the latter is provided by a second guide bar 148 secured on the bottom side of a plate 150 in turn secured to the bottom plate 82 as by bolts 152, adjacent an outer edge of the bottom plate. Plate 150 is spaced from bottom wall 82 at its outer edge by a spacer block 154 suitably secured, as by welding, to the bottom wall. For this latter guided movement, slide plate 140 has a guide bar 156 secured, as by bolts 158, to the top thereof which slidably engages the rear side of guide bar 148. Suitable bearings, not shown, and lubrication are provided between the slide plate 140 and its guiding parts to guide such slide plate in a straight line during cutting and retracting movements thereof with the cutting blade.

Slide plate 140 is driven in cutting and retracting movements of the cutter blade 130 by an hydraulic cylinder 164, FIGS. 4–7, mounted transversely of the cutter head 80. One end of the cylinder 164 is pivotally attached to a pin 166 in an end block 168 secured integrally to the bottom plate, as by welding. The other end of cylinder 164 is pivotally attached to a pin 172 in a block 174 secured integrally to a pair of transverse tapered walls 176 straddling the cylinder 164. These walls have recessed support at their bottom edge in the slide plate 140 and are secured thereto by bolts 178, FIG. 6.

Forward wall 98 has a bottom notch 182 in an intermediate portion thereof to allow the slide plate 140 to pass through and to slide transversely. Wall 98 also supports a dirt shield 184 secured as by screws 186 to an upper portion of such wall and extending out over the forward edge 140b, then freely into a transverse slot 186 in the bottom wall 82. This shield protects the exposed area of slide plate 140 and other interior parts at the rear of recess 86 from dirt or other foreign material.

Figure 8:
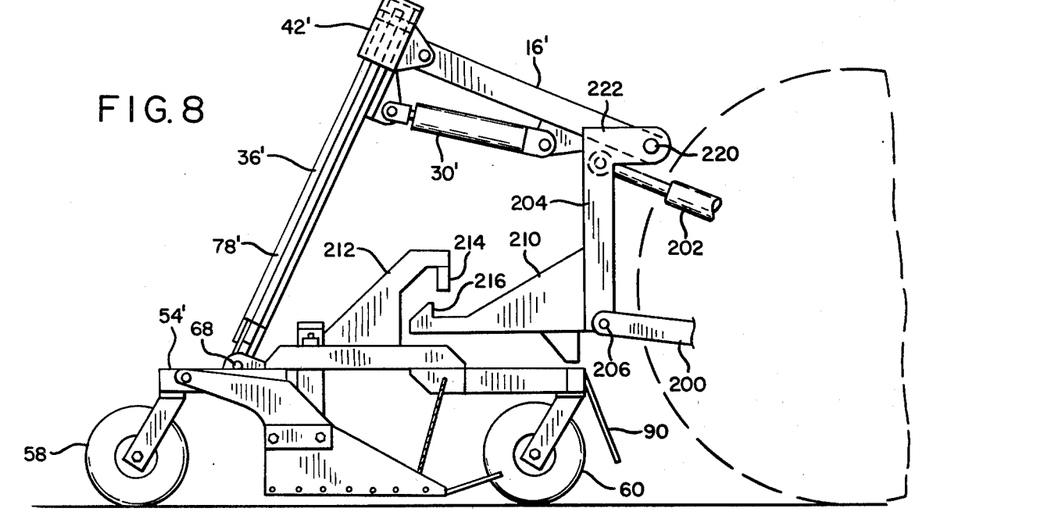
FIG. 8 is a side elevational view of a second form of the present tree cutting mechanism.
Figures 9, 10:
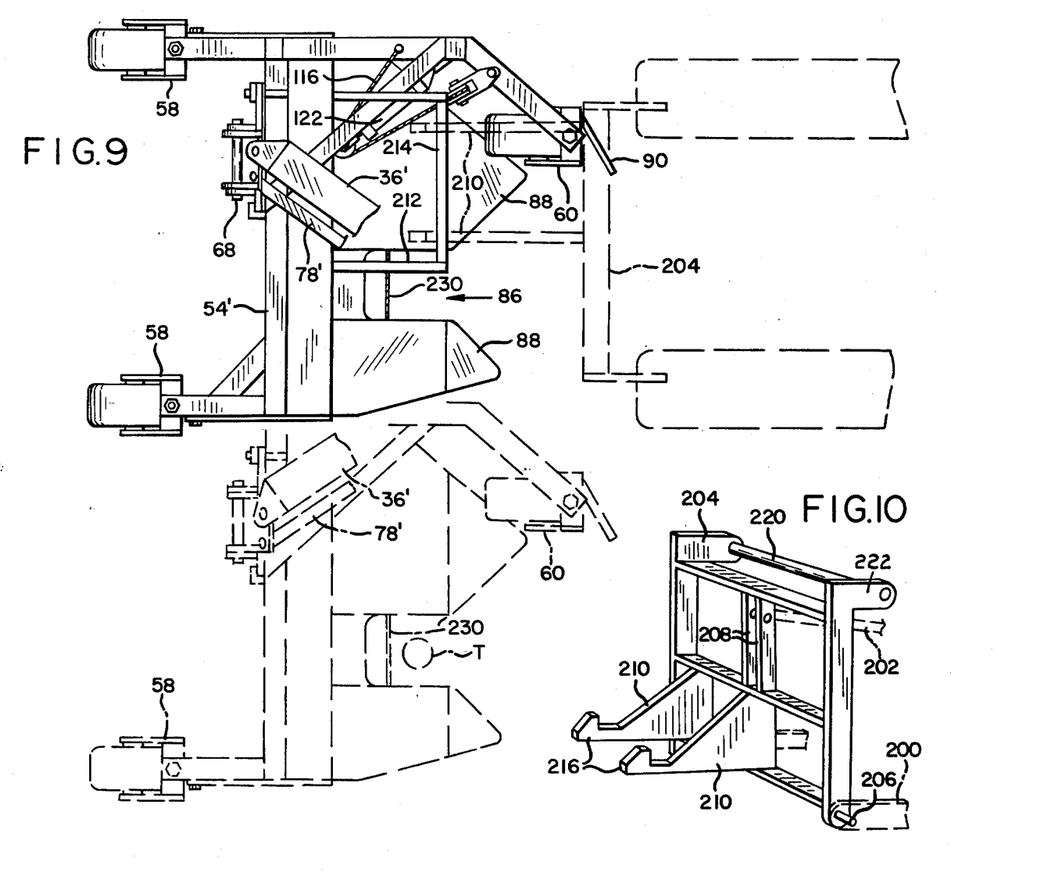
FIG. 9 is a plan view of the mechanism of FIG. 8.
FIG. 10 is a perspective view of an adapter frame used with the embodiment of FIGS. 8 and 9 for connection to a conventional three-point hitch of a pulling vehicle.

With reference to FIGS. 8, 9 and 10, an embodiment of the invention is shown that is arranged to be pulled down a row of trees rather than pushed as in FIG. 1, and furthermore this embodiment is adaptable for use with a conventional three-point hitch of a drive vehicle. A conventional three-point hitch is not detailed herein but in brief comprises a pair of bottom projecting support arms, one of which is shown in FIG. 8 and designated by the numeral 200, and a top arm 202. The three-point hitch has powered elevating means, not shown, associted with it.

The cutter vehicle 54' of this embodiment is substantially identical to the vehicle 54 of FIG. 1 in the structure involving the wheeled support and cutter knife as well as the guide and operating means for the cutter knife. Also, the articulated boom assembly is substantially the same, employing a primary boom 16' a secondary boom 36', and a hydraulical cylinder 30' arranged to operate the boom.

The cross frame member 42' which connects the two boom members 16' and 36' is identical to the structure of FIG. 1 and the connection of the boom 36' to the vehicle 54' is the same.

As stated, the mechanism of FIGS. 8 and 9 is adaptable for use with a conventional three-point hitch, and for this purpose employs an adapting frame 204 having bottom, laterally extending stub shafts 206 for attachment to the outer ends of support arms 200. Frame 204 also has a pair of upright webs 208 adjacent the upper end and in a laterally central position for attachment to the outer end of arm 202. Adapter frame 204 also has a pair of rearwardly extending arms 201 associated with brackets 212 integral with the vehicle 54' and secured together by a cross bar 214. Arms 210 have upturned ends 216 disposed slightly behind cross bar 214 and normally a small distance below the cross bar. By means of such structure, the vehicle is worked by the boom assembly with its wheel providing ground support but when it is desired that it be elevated for road travel, the three-point hitch is raised so that the arms 210 engage cross bar 214 and lift the vehicle off the ground. Upturned ends 216 engage behind bar 214 at this time to provide a draft connection.

The primary boom 16' is pivotally connected at the forward end to a cross shaft 220 supported in forwardly extending ear portions 222 at the top of the adapting frame 204. The primary boom includes a boom link 78' in a parallel linkage arrangement which maintains the vehicle in straight-ahead position even though it is offset in different positions laterally, as shown in full and broken lines in FIG. 9.

The cutter vehicle of FIGS. 8–10 operated in the same manner as in the FIG. 1 embodiment except as noted it is pulled along a row instead of being pushed. Also, as will be more apparent hereinafter, upon release of pressure in the cylinder 30' and a resistance force against the lower end of boom 36', the boom can flatten to allow the drive vehicle to proceed even though the vehicle 54' has stopped to cut momentarily.

Vehicle 54 or 54' is moved forward relative to a tree such that the trunk of the tree is received in the recess 87 at which time the cutter blade 130 is driven across the recess by the cylinder 164 to shear the tree. More particularly, the sequence of operation as controlled by control and actuating means is that at the time that the vehicle is moved forward to move a tree into recess 86, the cylinder 122 is retracted to support the head 80 in its lowered position close to the ground. At this time also the boom assembly has already been driven by cylinders 30 or 30' in a selected position, namely, the boom assembly of the FIG. 1 embodiment has been extended and the boom assembly of FIG. 8 has been retracted. As the tree moves into the recess 86 it not only actuates the cutter blade but it also releases fluid pressure to the cylinder 30, 30'. By such means, the boom assembly can freely float such that the drive vehicle can maintain a constant advancing movement even though the cutter vehicle stops at a tree for cutting. Also, as the tree has been sheared, control means operate to raise the head 80 so that it can advance over the top of the stump as the vehicle again proceeds. At this same time, pressure is again applied to the cylinder 30, 30' to position the boom while the vehicle 54, 54' is advancing toward the next tree in its condition capable of freely floating for the next shearing step. The arrangement is such that the boom will adjust in length under power at a rate that is faster than the traveling speed of a drive vehicle so as to accomplish the catch-up step.

A control device on the vehicle which enters into operation of the mechanism, in addition to other controls which will be described hereinafter, comprises a trip cable 230, FIGS. 3, 4, 6 and 11, anchored at one end 232 to the head 80 at one end of the tree recess 86 and exending across the recess forward of the bottom or rearward end of the latter. From there the trip cable extends over a switch operating cam 234 in driving relation therewith and then is anchored at its other end 236 to the head. A tension spring 238 in the cable provides spring return. Cam 234 has notched engagement with two switches 240 and 242 in an electric circuit. The cam 234 is structured and the switches 240 and 242 are located such that in an initial engagement and rearward movement of the cable 230 toward the bottom of recess 86 by a tree, the switch 240 will be operated and in a selected farther movement of the cable by the tree, the switch 242 will be operated.

Figure 11:
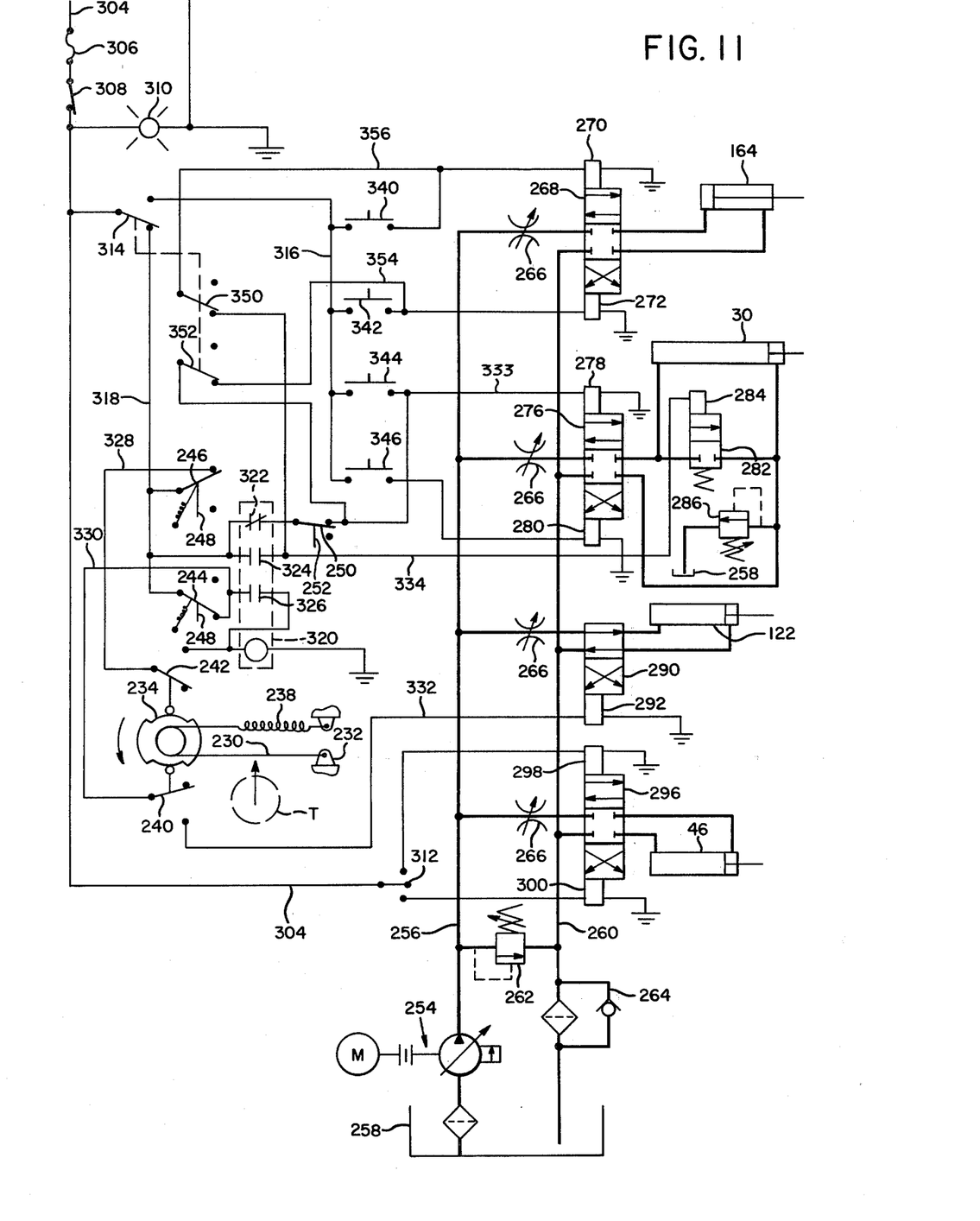
FIG. 11 is a schematic diagram of electrical and hydraulic controls of the present mechanism.

Other control devices comprise a normally closed switch 244 and a normally open switch 246, FIGS. 4, 5 and 11 operated by a finger 248 on the slide block 174 of the cylinder 164. Switch 244 is opened when the cylinder 164 and cutter blade 130 are extended and have cut a tree and switch 246 is held closed when the cylinder 164 and cutter blade 130 are retracted but will open upon movement of the blade toward cutting position. Also, a normally open switch 250, FIGS. 1, 3 and 11, is mounted on the frame of the vehicle 54 and is associated with an actuating arm 252 on the cutter head 80 in an arrangement that the switch will be opened when the head 80 is lowered.

With reference to the schematic diagram of FIG. 11, the fluid operated system for power devices of the mechanism and electrical control therefor are illustrated. Various portions of the fluid operated system and electrical controls are not shown in the mechanically illustrated views since the structure thereof and their hook-up are conventional.

The fluid operated system, FIG. 11, which may comprise a hydraulic system, comprises a pressure compensated motor-pump assembly 254 connected to a feed conduit 256 and associated with a reservoir 258 and a discharge conduit 260 emptying into the reservoir. The sytem includes conventional devices such as a pressure relief valve 262, one-way valve 264 into the reservoir, and adjustable control valves 266.

Feed and discharge conduits 256 and 260, respectively, are connected to the cutter cylinder 164 through a flow control valve 268 having a normal neutral position closing off pressure to the cylinder 164. Valve 268 is shifted from neutral to one of two operative positions at a time by opposite solenoids 270 and 272, these solenoids controlling cutting movement of cylinder 164, FIG. 4, for the cutter blade 130 and retraction, respectively.

Boom cylinder 30 or 30' is connected to feed and discharge conduits 256 and 260, respectively, through a flow control valve 276 having a normal neutral position closing off pressure to the cylinder 30 or 30'. Valve 276 is shifted from neutral to one of two operative positions at a time by opposite solenoids 278 and 280. These solenoids control extension and retraction of the boom, respectively, in the embodiment of FIG. 1 but a reversal of the hook-up of the hydraulic lines is required in the embodiment of FIG. 8 in that they control retraction and extension, respectively. A second valve 282 having a spring return to off position is movable to flow position by a solenoid 284, and upon energization of the solenoid this valve forms a by-pass so that the piston in boom cylinder 30 or 30' is made inoperative and can float in the cylinder, allowing free articulating movement of the boom. Excess fluid in this floating condition of the cylinder can flow back to the reservoir through a spring controlled one-way relief valve 286.

Cutter head lift cylinder 122 is connected to the feed and discharge conduits 256 and 260, respectively, through a flow control valve 290 having two positions. Valve 290 has spring return to its first position comprising operation of cylinder 122 to raise the cutter head and movement to its second position by a solenoid 292 for allowing the cutter head to lower by gravity.

Boom swing cylinder 46 or 46' is connected to feed and discharge conduits 256 and 260, respectively, through a flow control valve 296 having a normal neutral position closing off pressure to cylinder 46 or 46'. Valve 296 is shifted from neutral to one of two operative positions at a time by opposite solenoids 298 and 300. These solenoids control right and left movement of the boom.

The electrical control comprises in infeed line 304 with suitable fuse 306 and master switch 308 and pilot light 310. Infeed line leads to a three-position, normally open switch 312 which is manually operable for selective energization of solenoids 298 and 300 for causing boom swing cylinder to position the vehicle laterally of the drive vehicle as necessary.

Infeed line 304 also extends to a selector switch 314 associated with a manually operated circuit 316 and an automatic operating circuit 318. Circuit 318 includes the cutter control switches 244 and 246 and an associated relay 320 controlling a normally closed switch 322 and normally open switches 324 and 326. Switch 326 comprises a latching circuit for relay 320. The normally closed contact of switch 246 is electrically connected to switch 242 by a wire 328 and the normally closed contact of switch 244 is connected to switch 240 by a wire 330. The normally open contact of switch 240 is connected to solenoid 292 by a wire 332. Infeed wire for the automatic circuit 318 leads to the normally closed switch 322 and normally open switch 250 is connected to solenoid 278 by a wire 333. A wire 334 leads from normally open switch 324 to solenoid 284.

Manually operated switches 340, 342, 344 and 346 are in the circuit 316. These switches are normally open and are associated respectively with solenoids 270, 272, 278 and 280 for manual control of the cutter cylinder 164 and the boom cylinder 30 or 30'. Switch 314 is arranged to be positioned in the automatic mode circuit 318 or in the manual mode circuit 316 and includes a pair of switch arms 350 and 352 operable therewith. The contact of switch arm 352 in the automatic mode is connected to solenoid 272 by a wire 354 and the switch arm itself is connected to wire 333. The contact of switch arm 350 in the automatic mode is connected to wire 334 and the switch arm itself is connected to solenoid 270 by a wire 356. Switch portions 350 and 352 are incorporated in the system to isolate manual functions from the automatic.

OPERATION

FIG. 11 shows the control mechanism in rest position with the vehicle in readiness to start down a row of trees in automatic operation. Operation of the mechanism will make reference to the FIG. 1 embodiment. The motor-pump assembly 254 has been placed in operation, the master switch 308 has been closed, and the switch 314 moved to the automatic mode circuit 318. At this time, the circuit to solenoid 292 remains open since switch 240 is open whereby fluid pressure operates cylinder 122 to extend this cylinder and lift the cutter head 80. With the cutter head in up position, namely, as shown in FIG. 1, switch 250 is held in its closed position by actuating arm 252. A circuit through switch 314 and normally closed switch 322 and switch 250 exists to solenoid 278 whereby pressure is supplied through valve 276 to extend the boom assembly 16, 36. A circuit also now exists through isolator switch 352 to solenoid 272 whereby pressure is supplied through valve 268 to hold the cutter cylinder 164 in a retracted position so as to retract the cutter blade 130. With the cutter blade retracted both switches 244 and 246 are in closed position. Switch 312 is suitably positioned for laterally locating the boom assembly by cylinder 46, namely such boom will be positioned laterally for alignment of the tree receiving recess 86 with the row of trees.

As a tree T moves into recess 86 due to the advancement of the vehicle 54, initial engagement of cable 230 causes cam 234 to close switch 240 into circuit with wire 332 to energize solenoid 292 to retract the cutter head lift cylinder 122 for lowering the cutter head 80 to the ground or to a selected lowered point. Switch 250 opens by the lowering of the cutter head. This deenergizes solenoids 272 and 278. Further steady advancement of the cutter head causes further rotation of the cam 234 which while holding switch 240 closed moves switch 242 into the engagement with its normally open contact. This provides a path in the circuit 318 through switches 246 and 242 to energize the relay 320 which is now held in its latched condition by its latching circuit 326. Switch 242 serves solely to energize self-latching relay 320 and can subsequently open without changing operation of the system at this time.

Upon energization of relay 320, switch 322 opens and switch 324 closes. This opens the circuit to the now open switch 250. Solenoid 270 is energized at this time through switch 324 whereby the cutter cylinder 164 is put in operation to cut the tree. Also, a circuit is now present to solenoid 284 to allow free flow of fluid in the by-pass valve 282. This allows the boom assembly 16, 36 to freely articulate and the drive vehicle maintains its advancing movement even though the cutter vehicle has stopped to cut off the tree. Excess fluid from the cylinder 30 is returned to the reservoir through valve 286. As the cutter blade is closed, switch 246 is moved to its open position to open the original energizing circuit for self-latching relay 320.

As the cutter blade reaches its closed or sheared position, switch 244 is opened. This opens the latching circuit through switch 326 to relay 320 whereby to de-energize the cutter close solenoid 270, boom float solenoid 284, and cutter head solenoid 292. As the cutter head is lifted, its closes switch 250 which establishes a circuit to solenoids 272 and 278 to retract the cutter blade and to extend the boom. Thus, as the cutter vehicle is advancing to the next tree to accomplish the next cutting cycle, the boom is extending to its FIG. 1 position whereby such boom will be in readiness for the next cut and the drive vehicle maintains a steady pace down the row. In this regard, it is to be understood that the length powering means must be such that the boom extends or retracts faster than the traveling speed of the drive vehicle to accomplish the catch-up step.

The operation of the FIG. 8 embodiment is the same except that the hydraulic lines to boom cylinder 30 are reversed.

If it is desired that a tree or trees in a row be skipped, it is merely necessary at the end of a cut cycle to operate switch 312 to move the boom laterally out of the way of the row of trees such as shown in FIGS. 2 and 3, or 9.

Manual operation of the mechanism can be accomplished by moving switch 314 to manual circuit and manually operating switches 340, 342, 344 and 346 in proper sequence.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the boom assembly may have any other suitable length adjustment means besides the articulated structure shown, the only requirement being that the boom can adjust in length when the tree is being cut and also when the cutter vehicle is catching up for the next cut.

Having thus described my invention, I claim:

1. A tree cutting mechanism comprising:
   (a) a cutter vehicle arranged to be moved along a row of trees by a powered drive vehicle,
   (b) a boom assembly secured to said cutter vehicle and arranged to be secured at its other end to a powered drive vehicle,
   (c) said boom assembly being constructed of relatively movable parts which can extend and retract to vary the longitudinal length of said boom assembly,
   (d) operating means on said boom assembly arranged to provide powered relative movement of said boom assembly parts to vary the length thereof,
   (e) said operating means including release means arranged when actuated to release said movable parts of said boom assembly for free relative movement,
   (f) power cutter means on said cutter vehicle arranged to be driven in cutting and retracting movements and arranged in its cutting movement to cut a tree off adjacent the ground,
   (g) and control means associated with said cutter means and said operating means on said boom assembly,
   (h) said control means having structure capable of actuating said power cutter means to cut a tree substantially simultaneously with the actuation of said release means thereby the movable parts of said boom assembly can have free relative movement and allow the power drive vehicle to advance while said cutter vehicle has stopped momentarily to cut a tree.

2. The tree cutting mechanism of claim 1 wherein said cutter vehicle has wheeled support for traveling movement on the ground.

3. The tree cutting mechanism of claim 1 wherein said cutter vehicle has wheeled support for traveling movement on the ground, the securement of said boom assembly to said cutter vehicle providing longitudinal and lateral pivoting movement of said cutter vehicle for self adjustment to ground contours.

4. The tree cutting mechanism of claim 1 wherein said boom assembly is of articulated structure providing its extending and retracting movements.

5. The tree cutting mechanism of claim 1 wherein said boom assembly includes pivot means providing lateral positioning of said cutter vehicle whereby to bypass a tree if desired.

6. The tree cutting mechanism of claim 1 wherein said boom assembly includes pivot means providing lateral positioning of said cutter vehicle whereby to bypass a tree if desired, said pivot means including a parallelogram linkage providing forwardly directed positioning of said cutter vehicle in all lateral positions thereof.

7. The tree cutting mechanism of claim 1 wherein said power cutter means comprises a laterally movable shearing blade, said cutter vehicle including guide means for guiding it into cutting position on a tree, said control means including trip means in said guide means arranged when engaged by a tree received in said guide means to actuate said power cutter means to cut a tree.

8. The tree cutting mechanism of claim 7 wherein said trip means also releases said operating means on said boom assembly for said free relative movement of the parts of said boom assembly.

9. The tree cutting mechanism of claim 7 wherein said cutter vehicle has a main frame having ground engaging means for traveling support on the ground, a secondary frame pivotally supported at one of its ends on said main frame, said power cutter means being supported on said secondary frame, and power lift means connected between said main frame and said secondary frame arranged to pivot said secondary frame upwardly following a shearing step to clear a stump made by a cut of the power cutter means.

10. The tree cutting mechanism of claim 7 wherein said cutter vehicle has a main frame having ground engaging means for traveling support on the ground, a secondary frame having vertical adjustable support on said main frame, said power cutter means being supported on said secondary frame, power lift means connected between said main frame and said secondary frame arranged to move said secondary frame upwardly from a lowered position following a cutting step to clear a stump made by a cut of the power cutter means, said power lift means being controlled by said control means, said trip means having two stages of operation a first of which when actuated by a tree causes said control means to actuate said power lift means for lowering said secondary frame assembly and a second of which when further actuated by a tree causes said control means to provide said actuation of said power cutter means.

11. The tree cutting mechanism of claim 1 wherein said cutter vehicle has forward and rearward ends and said power cutter means operates through said forward end, said boom assembly being secured to the rearward end of said cutter vehicle and providing a pulling drive to said cutter vehicle.

12. The tree cutting mechanism of claim 1 wherein said cutter vehicle has forward and rearward ends and said power cutter means operates through said forward end, said boom assembly being secured to the rearward end of said cutter vehicle and providing a pushing drive to said cutter vehicle.

* * * * *